(12) United States Patent
Bona et al.

(10) Patent No.: US 10,390,019 B2
(45) Date of Patent: Aug. 20, 2019

(54) METHOD AND DEVICE FOR ENCODING A MULTIDIMENSIONAL DIGITAL SIGNAL, IN PARTICULAR AN IMAGE SIGNAL, AND CORRESPONDING METHOD AND DEVICE FOR DECODING

(71) Applicant: STMICROELECTRONICS (GRENOBLE 2) SAS, Grenoble (FR)

(72) Inventors: Mariano Bona, Grenoble (FR); Fritz Lebowsky, St. Martin d'Uriage (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 393 days.

(21) Appl. No.: 15/223,294

(22) Filed: Jul. 29, 2016

(65) Prior Publication Data
US 2017/0223358 A1 Aug. 3, 2017

(30) Foreign Application Priority Data
Feb. 2, 2016 (FR) ...................... 16 50814

(51) Int. Cl.
*H04N 19/132* (2014.01)
*H04N 19/117* (2014.01)
*H04N 19/172* (2014.01)
*H04N 19/176* (2014.01)
*H04N 19/182* (2014.01)
(Continued)

(52) U.S. Cl.
CPC ......... *H04N 19/132* (2014.11); *H04N 19/105* (2014.11); *H04N 19/117* (2014.11); *H04N 19/136* (2014.11); *H04N 19/172* (2014.11); *H04N 19/176* (2014.11);
(Continued)

(58) Field of Classification Search
CPC .... H04N 19/132; H04N 19/105; H04N 19/85; H04N 19/172
See application file for complete search history.

(56) References Cited

U.S. PATENT DOCUMENTS 5,612,743 A * 3/1997 Lee ...................... H04N 19/537
375/240.16
6,654,503 B1 11/2003 Sudharsanan et al.
(Continued)

OTHER PUBLICATIONS

Drugeon, "TE12.3: results for edge based prediction", JCT-VC Meeting; 94, Collaborative Team on Video Coding of ISO/IEC, Oct. 2010, pp. 1-6.
(Continued)

*Primary Examiner* — Dave Czekaj
*Assistant Examiner* — Berteau Joisil
(74) *Attorney, Agent, or Firm* — Slater Matsil, LLP

(57) ABSTRACT

A method of encoding an initial digital signal in an encoded signal, where the initial digital signal includes a sequence of samples representing a multidimensional space, and each sample may be assigned at least one physical magnitude. The method may include, for at least some of the current samples, locally encoding the signal in encoded local digital signals, with the encodings being performed in local reference frames each including the current sample considered and two reference samples. The reference samples may be chosen based upon a minimum gradient of the at least one physical magnitude, from among the available samples of the sequence, and the encoded signal may include the encoded local digital signals.

26 Claims, 15 Drawing Sheets

(51) Int. Cl.
- *H04N 19/105* (2014.01)
- *H04N 19/593* (2014.01)
- *H04N 19/136* (2014.01)
- *H04N 19/85* (2014.01)

(52) U.S. Cl.
CPC ......... *H04N 19/182* (2014.11); *H04N 19/593* (2014.11); *H04N 19/85* (2014.11)

(56) References Cited

U.S. PATENT DOCUMENTS

| | | | |
|---|---|---|---|
| 9,386,190 B2 | 7/2016 | Lebowsky | |
| 2010/0054613 A1* | 3/2010 | Henry | G06T 9/20 382/233 |
| 2011/0090956 A1* | 4/2011 | Youn | H03M 7/4006 375/240.12 |

OTHER PUBLICATIONS

Sanchez, "Fast intra-prediction for lossless coding of screen content in HEVC", IEEE Global Conference on Signal and Information Processing, Dec. 2015, pp. 1367-1371.

Abdolrahman et al, "An accurate gradient-based predictive algorithm for image compression", Advances in Mobile Computing and Multimedia, Nov. 2010, pp. 374-377.

Baghaie et al, "Structure Tensor Based Image Interpolation Method", University of Wisconsin, Feb. 2015, pp. 1-14.

Estellers et al, "Adaptive regularization with the structure tensor", IEEE Transactions on Image Processings, vol. 24, No. 6, Jun. 2015, pp. 1777-1790.

Nicolas et al., "Optimizing color fidelity for display devices using vectorized interpolation steered locally by perceptual error quantities", Jan. 2015, pp. 1-12.

"Image Processing of Tensor Fields", STMicroelectronics, Nov. 2015, pp. 1-5.

Zimmer, "PDE-based image compression using corner information" Saarland University, Faculty of Natural Sciences and Technology, Sep. 2007, pp. 1-137.

Tschumperle et al., "PDE's based regularization of multivalued images and applications", Universite de Nice-Sophia Anatipolis, Dec. 2002, pp. 1-186.

Bruni et al., "A novel adaptive vector quantization method for memory reduction in MPEG-2 HDTV decoders", IEEE Transactions on Consumer Electronics, vol. 44, No. 3, Aug. 1998, pp. 537-544.

Hunt, "The art of image processing with Java", book, chapter 8.5, ISBN 9781568817170, 2010, p. 205.

* cited by examiner

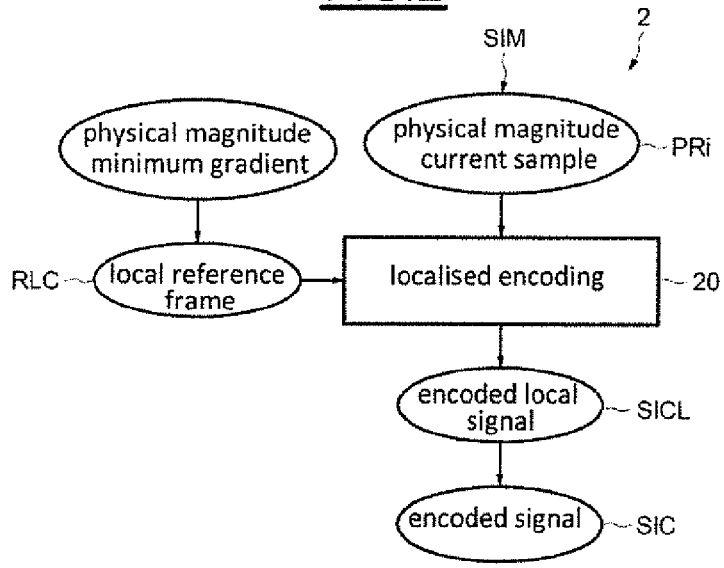
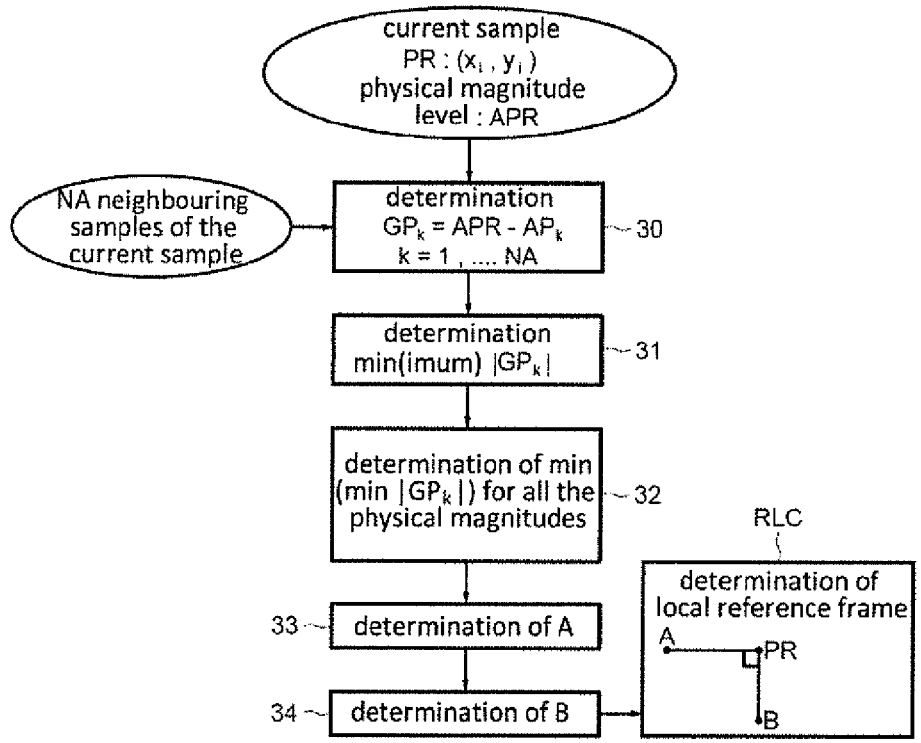

| position A | STRC |
|---|---|
| ECH 2 | 0 0 |
| ECH 3 | 0 1 |
| ECH 4 | 1 0 |
| ECH 5 | 1 1 |

METHOD AND DEVICE FOR ENCODING A MULTIDIMENSIONAL DIGITAL SIGNAL, IN PARTICULAR AN IMAGE SIGNAL, AND CORRESPONDING METHOD AND DEVICE FOR DECODING

RELATED APPLICATIONS

This application is a translation of and claims the priority benefit of French patent application number 1650814 filed on Feb. 2, 2016, entitled "Method And Device For Encoding A Multidimensional Signal, In Particular An Image Signal, And Corresponding Decoding Method And Device" which is hereby incorporated by reference to the maximum extent allowable by law.

TECHNICAL FIELD

Implementations and embodiments relate to the encoding, and more particularly the compression, of digital data, and notably the encoding of a digital signal representing a multidimensional space, e.g., an image signal, as well as other multidimensional signals such as multichannel audio signals, for example.

BACKGROUND

Generally, in the context of image processing, an image frame to be displayed on a screen, e.g., a television screen, is represented by a matrix structure of digital information representing a grid of pixels, and multiple color components are assigned to each pixel. For example, the components of luminosity Y and chrominance Cr and Cb each possess a level or amplitude for the pixel considered. Such a pixel structure, or "bitmap", therefore corresponds bit for bit or pixel by pixel, to the image (this is then referred to as a "raster" image) which has to be displayed on the screen. Generally speaking, the pixel structure is in the same format as that used for storage in the video memory of the screen. The raster frame thus stored in the video memory will be read pixel by pixel on a row and row by row. This is then referred to as a "raster scan".

Currently, the size of the frames used for high-definition digital television (HDTV) is a size known as "2K1K", i.e., including 1080 rows of 1920 pixels. Moreover, the frequency, i.e., the number of frames per second, is 60 Hz.

For transmitting such an image signal issued by the TV decoder on the wired connection linking this decoder to the television, compression of the image signal issued by the decoder is performed. Indeed, transmitting such an image signal without compression requires extremely high transfer speeds which are generally costly and create electromagnetic interference. This is the reason for compressing the signal issued by the decoder.

Compression/decompression processing may also be desirable for storing images in a memory internal or external to the decoder. A video signal is generally received in an encoded format, e.g., according to standards H264 or HEVC. The signal is decoded in an RGB or $YC_bC_r$ image format more voluminous in memory space.

However, various processings are usually applied to the decoded images. Between each processing, the images are stored, e.g., in buffer memories, in the decoded format. To limit the capacity of the memories used, it is advantageous to compress the decoded images before storage in the memory, then decompress them when reading in the memory before processing. Such compressions/decompressions should not introduce any degradation of the images.

Currently, conventional compression of a video signal may be performed by applying a two-dimensional low-pass filter on the chrominance components of the image signal. However, even if the quality of the image finally displayed on the screen remains acceptable, high frequency information of the image signal may be lost.

SUMMARY

According to one implementation and embodiment, a method and a device are provided for encoding/decoding a multidimensional signal, leading to a compression/decompression of the multidimensional signal, for preserving the spectral performance over the entire frequency band of the signal (absent a linear filter), while not being significantly impacted by Gaussian white noise.

In the video field, a method and a device are provided for encoding/decoding, being advantageously expressed by compression/decompression, for reducing visible degradations of the displayed image.

A method and an encoding device are also provided for significantly increasing the rate of compression for at least achieving, for example, a compression rate of 3×.

According to one aspect, a method is provided for encoding an initial digital signal, e.g., an image signal, in an encoded signal. The initial digital signal includes a sequence of samples, e.g., of pixels, representing a multidimensional space (e.g., an image).

Each sample is assigned at least one physical magnitude. In the case of an image signal, each pixel is assigned, for example, color components that form the physical magnitudes.

In the case of a multichannel audio signal, the physical magnitudes of each audio sample may be the sound levels of each of the channels.

In the case of a video application, the sequence of pixels may be a complete frame of the image or a macroblock (e.g., 64×64 pixels) of the image, with the macroblocks arriving sequentially. The sequence of pixels may also be understood as being a succession of the pixels of the image frame, these pixels arriving sequentially and row by row, in accordance with the "raster" format.

The method includes, for at least some of the current samples, localized encodings of the signal in encoded local digital signals. The encoding may be performed in local reference frames each including the current sample considered and two reference samples. The samples may be chosen, on the basis of a minimum gradient of the at least one physical magnitude, from among the available samples of the sequence, with the encoded signal including the encoded local digital signals.

The available samples of the sequence may be all or part of the samples already received, e.g., samples that have already arrived in the case of a "raster" format, or samples of the macroblock that has arrived and includes the current sample. Moreover, these available samples may or may not have already undergone a localized encoding. These available samples may or may not be neighboring samples of the current sample or samples farther away from this sample.

The choice of the size of the area including the available samples notably results from a compromise between the complexity of processing and the desired accuracy for the encoded signal.

The gradient of a physical magnitude assigned to a current sample is understood, for example, as the variation in level of this physical magnitude seen at the level of this current sample, i.e., as the difference between the level of the physical magnitude assigned to the current sample and the level of this same physical magnitude assigned to another sample, e.g., a neighboring sample of this current sample.

Thus, a localized encoding is advantageously provided using a separation of the information conveyed by the signal (e.g., the color information of the image) into a pair of components, namely a gradient amplitude and a structure (local reference frame). The gradient amplitude/structure pair is calculated sample by sample (e.g., pixel by pixel) by searching for the pair having the minimum error in an area of available candidate samples, e.g., a localized area in the neighborhood of the current sample.

In practice, the features of the localized encoding of the signal are preferably chosen so that the number of bits of each encoded local digital signal is less than the number of bits on which the level of the physical magnitude considered is represented.

For example, if the physical magnitudes are represented by words of 10 to 16 bits, preference should be given to choosing the characteristics of the localized encoding to obtain a local encoded signal on a number of bits less than or equal to 9, or even on a much lower number of bits.

Thus, the localized encoding is expressed by a localized compression.

However, it is possible that in some applications, e.g., for physical magnitudes represented by words of 8 bits, the localized encoding leads for some samples to a local digital signal encoded on a number of bits greater than 8, e.g., 9 bits. However, it proves that for other samples the local signal may be encoded on a much lower number of bits, e.g., 3 bits, thus nevertheless resulting overall for the encoded signal in a compressed signal.

According to one implementation, each localized encoding comprises for each physical magnitude assigned to the current sample considered, a digital parameter setting of the local reference frame and the level of the physical magnitude considered in the local reference frame to obtain the local encoded signal associated with the current sample and the physical magnitude considered.

According to one implementation, each localized encoding includes, for each physical magnitude assigned to the current sample considered, a determination of the local reference frame formed by the current sample and the two reference samples selected at least from a determination of the gradient having the lowest absolute value among the gradients of the physical magnitude considered between the current sample and at least two available samples, e.g., two neighboring samples of this current sample.

According to one implementation, a first reference sample of the local reference frame is selected at least from the determination of the gradient having the lowest absolute value among the gradients of the physical magnitude considered. The second reference sample is a remaining available sample forming a right angle with the first reference sample and the current sample, or a remaining available sample selected at least from the determination of the gradient having the largest absolute value among the gradients of the physical magnitude considered.

When each sample is assigned multiple physical magnitudes, as is the case for a pixel assigned multiple color components, for example, it is possible to determine a local reference frame for each physical magnitude associated with this current sample.

However, in practice, it is preferable for reasons of simplicity to determine, for each current sample, a unique local reference frame valid for all the physical magnitudes assigned to this current sample.

According to one implementation, the determination of the local reference frame includes, for each current sample belonging to a group of at least three samples including the current sample and at least two available samples (e.g., two neighboring samples of this current sample), a first step of determining, for each physical magnitude, the gradients of this physical magnitude between the current sample and each available sample. A further step includes selecting the first reference sample from among the available samples of the available sample of which the associated gradient has the lowest absolute value among all the gradients calculated for all the physical magnitudes. A second step includes determining the second reference sample from among the remaining available samples of the available sample forming a right angle with the first reference sample and the current sample, or corresponding to the available sample of which the associated gradient has the largest absolute value among all the gradients calculated for all the physical magnitudes.

According to an advantageous implementation, particularly well suited to a "raster scan", for each current sample the group includes the current sample and four neighboring samples having already given rise to the establishment of the encoded local digital signals associated with these neighboring samples. The second reference sample is that which forms a right angle with the first reference sample and the current sample.

According to one implementation, the parameter setting of the local reference frame includes a preparation of a group of first bits (e.g. two bits), the values of which define the structure of the local reference frame from among a set of possible structures.

According to one implementation, the parameter setting of the level of the physical magnitude considered in the local reference frame includes a determination of a polarity bit, the value of which indicates at least the positioning of the level of the physical magnitude considered assigned to the current sample with respect to the level of the physical magnitude assigned to the first reference sample. It will be seen in more detail below that in some cases this polarity bit may further indicate whether the level of the physical magnitude considered assigned to the current sample is or is not located between the level of the physical magnitude assigned to the first reference sample and the level of the physical magnitude assigned to the second reference sample.

According to one implementation, the parameter setting of the level of the physical magnitude considered in the local reference frame includes preparing a parameter involving at least the absolute value of the gradient, known as the first gradient, of the physical magnitude between the current sample and the first reference sample, comparing this parameter with a threshold, and preparing a third bit representative of the result of the comparison.

As will be seen in more detail below, this parameter may be, for example, the absolute value of the first gradient itself or a normalized gradient.

The use of a normalized gradient brings greater accuracy and a better image quality, but requires performing a division within the encoder. The use of the absolute value of the single first gradient is simpler to implement and proves sufficient in most applications.

Whatever the choice made for the parameter, if the parameter is less than or equal to the threshold, it is advantageously regarded as zero. In this case, as will be seen in more detail below, this leads to a local signal encoded on a very small number of bits (e.g., 3 bits), which leads to a high rate of compression.

If the threshold is chosen such that for a very large number of samples (e.g., 90% of the samples), the parameter is zero, then a useful rate of compression may be obtained.

Moreover, the parameter setting of the level of the physical magnitude considered in the local reference frame further advantageously includes a compressive encoding on a group of second bits of the parameter to obtain a compressed parameter.

As indicated previously, according to a possible variant, the polarity bit indicates whether the level of the physical magnitude considered assigned to the current sample is or is not located between the level of the physical magnitude assigned to the first reference sample and the level of the physical magnitude assigned to the second reference sample. The parameter setting of the level of the physical magnitude considered in the local reference frame further includes determining the absolute value of the gradient, known as the second gradient, of the physical magnitude between the current sample and the second reference sample, determining a normalized gradient from the absolute values of the first gradient and the second gradient, with the normalized gradient forming the parameter.

According to another possible variant, the polarity bit indicates whether the level of the physical magnitude considered assigned to the current sample is less than or greater than the level of the physical magnitude assigned to the first reference sample, and the absolute value of the first gradient forms the parameter.

According to one implementation, compatible notably with the two variants mentioned above, the encoded local digital signal associated with the physical magnitude considered assigned to the current sample includes at least the third bit, i.e., the bit representative of the result of the comparison between the parameter and the threshold.

However, the encoded local digital signal associated with the physical magnitude considered assigned to the current sample may include the group of first bits (representative of the structure of the local reference frame) and optionally, the compressed parameter and the polarity bit.

More precisely, if the parameter is less than or equal to the threshold, the encoded local digital signal then advantageously contains only the group of first bits and the third bit. If the parameter is greater than the threshold, the encoded local digital signal then advantageously includes the group of first bits, the compressed parameter, the polarity bit and the third bit.

With a view to iterative error estimation, it is advantageous that the parameter setting of the level of the physical magnitude considered in the local reference frame further includes a preparation from the compressed parameter of a first compressed additional digital word, and of a second compressed additional digital word surrounding the compressed parameter, a decompressive decoding of the first compressed additional digital word, and a reconstruction of the level of the physical magnitude from the first decoded additional digital word to obtain a first reconstructed level for the physical magnitude.

The parameter setting may further include preparing a first error between the level of physical magnitude considered and the first reconstructed level, a decompressive decoding of the second compressed digital word, reconstructing the level of the physical magnitude from the second decoded additional digital word to obtain a second reconstructed level for the physical magnitude, preparing a second error between the level of physical magnitude considered and the second reconstructed level, selecting the first or the second compressed additional digital word which gives the lowest error of the first error and the second error. If the parameter is less than or equal to the threshold, it is then considered as zero and the encoded local digital signal then contains only the group of first bits and the third bit. However, if the parameter is greater than the threshold, the encoded local digital signal then contains the group of first bits, the selected compressed additional digital word, the polarity bit and the third bit.

In other words, in this case the compressed parameter (i.e., for example, the first compressed gradient or the compressed normalized gradient) is replaced by the selected compressed additional digital word, i.e., that which leads to the lowest error.

To allow error diffusion, the parameter setting of the level of the physical magnitude considered in the local reference frame may further advantageously include adding a pseudo-random quantity on the parameter or on the compressed parameter.

In some cases, the sample sequence may be subdivided into multiple subsequences. This is, for example, the case when the signal is a video signal encoded in $YC_bC_r$ 420 format. The first subsequence may then comprise the samples assigned $YC_bC_r$ components. The second subsequence may include samples located between the samples of the first subsequence, and the third subsequence may include samples assigned the Y component and surrounded by the samples of the second subsequence.

Localized compressions may then be performed in parallel or sequentially on each of these subsequences.

To obtain a constant tolerance during localized encodings, it may be advantageous that the initial signal on which these localized encodings are performed results from a preprocessing performed on a base signal. The preprocessing may include, for example, a pre-emphasis processing.

According to another aspect, provision is made for a method of decoding a digital signal in a decoded signal, the digital signal having been encoded by the method of encoding as defined above. The method may include, for each current sample and for each physical magnitude, preparing the level of the physical magnitude considered from the encoded local digital signal associated with this current sample to issue a decoded local signal. The decoded signal may include the decoded local signals.

When the initial digital signal has been encoded following a pre-emphasis processing, it is advantageous to perform a post-processing on the decoded signal. The post-processing may include a de-emphasis processing.

According to another aspect, a device for encoding an initial digital signal in an encoded signal is provided. The initial digital signal may include a sequence of samples representing a multidimensional space, with each sample being assigned at least one physical magnitude. The encoding device may include a processor or processing means configured for performing, for at least some of the current samples, localized encodings of the signal in an encoded local digital signal in local reference frames each including the current sample considered and two reference samples. The two reference sample are chosen based upon a minimum gradient of the at least one physical magnitude, from among the available samples of the sequence. The encoded signal includes the encoded local digital signals.

According to one embodiment, the processing means are configured for performing, for each localized encoding for each physical magnitude assigned to the current sample considered, a digital parameter setting of the local reference frame and the level of the physical magnitude considered in the local reference frame to obtain the encoded local digital signal associated with the current sample considered and the physical magnitude considered.

According to one embodiment, the processing means are configured for performing, for each localized encoding for each physical magnitude assigned to the current sample considered, a determination of the local reference frame formed by the current sample and the two reference samples selected at least from a determination of the gradient having the lowest absolute value among the gradients of the physical magnitude considered between the current sample and at least two available samples.

According to one embodiment, the processing means are configured for selecting a first reference sample of the local reference frame at least from the determination of the gradient having the lowest absolute value among the gradients of the physical magnitude considered. The second reference sample is a remaining available sample forming a right angle with the first reference sample and the current sample, or a remaining available sample selected at least from the determination of the gradient having the largest absolute value among the gradients of the physical magnitude considered.

According to one embodiment, each sample is assigned multiple physical magnitudes and for each current sample, the processing means are configured for determining a unique local reference frame valid for all the physical magnitudes assigned to this current sample.

According to one embodiment, the processing means are configured for performing, for each current sample belonging to a group of at least three samples including the current sample and at least two available samples, the local determination of the local reference frame. This may include a first step of determining for each physical magnitude, including a determination of the gradients of this physical magnitude between the current sample and each available sample, selecting the first reference sample including a selection from among the available samples of the available sample of which the associated gradient has the lowest absolute value among all the gradients calculated for all the physical magnitudes. A second step includes determining the second reference sample by determining from among the remaining available samples of the available sample forming a right angle with the first reference sample and the current sample or corresponding to the available sample of which the associated gradient has the largest absolute value among all the gradients calculated for all the physical magnitudes.

According to one embodiment, for each current sample the group includes the current sample and four neighboring samples having already given rise to the establishment of the digital blocks associated with these neighboring samples. The second reference sample is that which forms a right angle with the first reference sample and the current sample.

According to one embodiment, the processing means are configured for performing, for the parameter setting of the local reference frame, a preparation of a group of first bits the values of which define the structure of the local reference frame from among a set of possible structures.

According to one embodiment, the processing means are configured for performing, for the parameter setting of the level of the physical magnitude considered in the local reference frame, a determination of a polarity bit the value of which indicates at least the positioning of the level of the physical magnitude considered assigned to the current sample with respect to the level of the physical magnitude assigned to the first reference sample.

According to one embodiment, the processing means are configured for performing, for the parameter setting of the level of the physical magnitude considered in the local reference frame, a preparation of a parameter involving at least the absolute value of the gradient, known as the first gradient, of the physical magnitude between the current sample and the first reference sample, a comparison of this parameter with a threshold, and preparation of a third bit representative of the result of the comparison.

According to one embodiment, if the parameter is less than or equal to the threshold, it is considered as zero.

According to one embodiment, the processing means are configured for performing, for the parameter setting of the level of the physical magnitude considered in the local reference frame, a compressive encoding on a group of second bits of the parameter to obtain a compressed parameter.

According to one embodiment, the polarity bit indicates whether the level of the physical magnitude considered assigned to the current sample is or is not located between the level of the physical magnitude assigned to the first reference sample and the level of the physical magnitude assigned to the second reference sample. Moreover, the processing means may be configured for further performing, for the parameter setting of the level of the physical magnitude considered in the local reference frame, a determination of the absolute value of the gradient, known as the second gradient, of the physical magnitude between the current sample and the second reference sample, and a determination of a normalized gradient from the absolute values of the first gradient and the second gradient, with the normalized gradient forming the parameter.

According to another embodiment, the polarity bit indicates whether the level of the physical magnitude considered assigned to the current sample is less than or equal to or greater than the level of the physical magnitude assigned to the first reference sample, and the absolute value of the first gradient forms the parameter.

According to one embodiment, the encoded local digital signal associated with the physical magnitude considered assigned to the current sample includes at least the third bit.

According to one embodiment, the encoded local digital signal associated with the physical magnitude considered assigned to the current sample includes the group of first bits and optionally, the compressed parameter and the polarity bit.

According to one embodiment, if the parameter is less than or equal to the threshold, the encoded local digital signal then includes only the group of first bits and the third bit, and if the parameter is greater than the threshold, the encoded local digital signal then includes the group of first bits, the compressed parameter, the polarity bit and the third bit.

According to one embodiment, the processing means are configured for further performing, for the parameter setting of the level of the physical magnitude considered in the local reference frame, a preparation from the compressed parameter of a first compressed additional digital word and of a second compressed additional digital word surrounding the compressed parameter, a decompressive decoding of the first compressed additional digital word, a reconstruction of the level of the physical magnitude from the first decoded additional digital word to obtain a first reconstructed level for the physical magnitude.

The processing means may be further configured to perform a preparation of a first error between the level of physical magnitude considered and the first reconstructed level, a decompressive decoding of the second compressed digital word, a reconstruction of the level of the physical magnitude from the second decoded additional digital word to obtain a second reconstructed level for the physical magnitude, a preparation of a second error between the level of physical magnitude considered and the second reconstructed level, and a selection of that of the first or the second compressed additional digital word which gives the lowest error of the first error and the second error. If the parameter is less than or equal to the threshold, it is then considered as zero, and the encoded local digital signal then includes only the group of first bits and the third bit. If the parameter is greater than the threshold, the encoded local digital signal then includes the group of first bits, the selected compressed additional digital word, the polarity bit and the third bit.

According to one embodiment, the processing means are configured for further performing, for the parameter setting of the level of the physical magnitude considered in the local reference frame, adding a pseudo-random quantity on the parameter or on the compressed parameter.

According to one embodiment, the sequence of samples is subdivided into multiple subsequences, and the processing means are configured for performing the local encodings on current samples belonging to at least one subsequence of the sequence.

The initial digital signal may be a video signal, with each sample being one pixel and each physical magnitude being a color component of the pixel.

According to another aspect, a device is provided for decoding a digital signal encoded by the encoding device as defined above, configured for issuing a decoded signal. The device includes a processor or processing means configured for, for each current sample, performing a preparation of the level of the physical magnitude considered from the encoded local digital signal associated with this current sample to issue a decoded local signal. The decoded signal may include the decoded local signals.

According to another aspect, a computer program product directly loadable into a memory of a computer system is provided, which may include portions of software code for executing the method of encoding as defined above or the method of decoding as defined above, when the program is executed on the computer system.

According to another aspect, a non-transitory medium readable by a computer system is provided, having instructions executable by computer suitable for causing the execution by the computer system of the method of encoding as defined above or of the method of decoding as defined above.

BRIEF DESCRIPTION OF THE DRAWINGS

Other advantages and features of the invention will appear upon examining the detailed description of implementations and embodiments, which are in no way restrictive, and the drawings in which:

FIG. 2 is flow diagram of a method for encoding an image signal in accordance with an example embodiment;

FIG. 3 is a flow diagram illustrating an approach for determining the local reference frame for a current sample (pixel) in accordance with an example embodiment;

DETAILED DESCRIPTION

Figure 1:
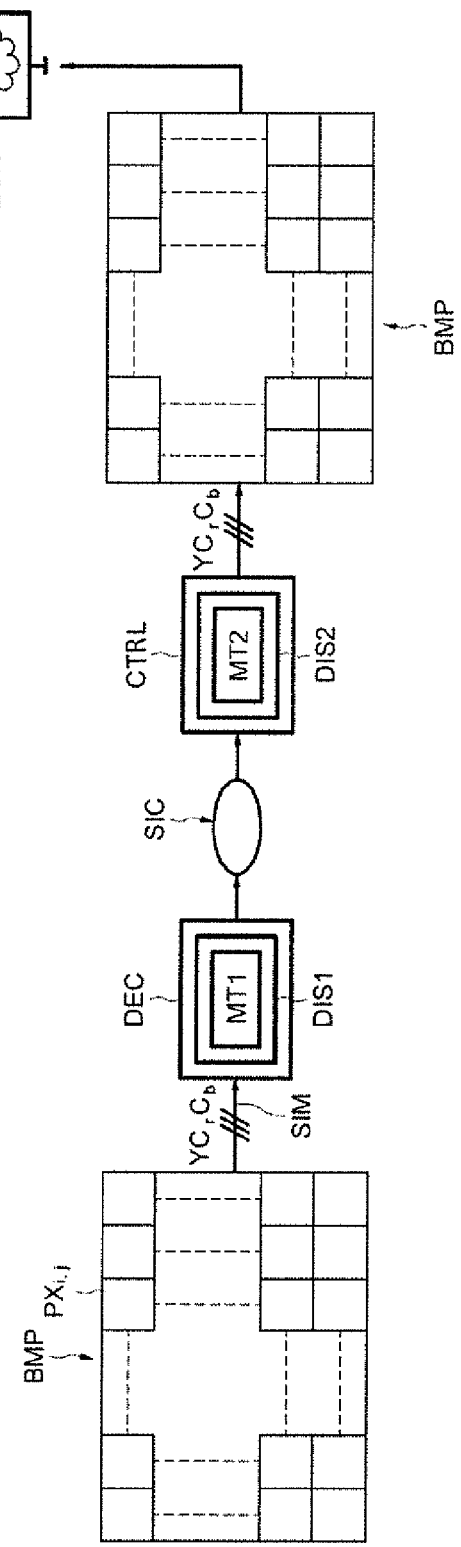
FIG. 1 is a schematic block diagram of a device for encoding an image signal in accordance with an example embodiment.

Referring to FIG. 1, the reference DIS1 designates a device for encoding an image signal. The device DIS1 may be incorporated in a video decoder DEC, e.g., a TV decoder compliant with MPEG standards.

The device DIS1 receives an initial image signal SIM comprising a sequence BMP of pixels $PX_{i,j}$. Each pixel is assigned multiple digital color components, here three color components, namely a luminance component Y, a chrominance component Cr and another chrominance component Cb.

The sequence BMP of pixels may be a complete frame of the image stored in a video memory. As a variant, the pixels of the image frame may be issued sequentially one by one and row by row ("raster" format). The pixels of the sequence may also be issued macroblock by macroblock. In this case, the macroblocks are stored in a video memory and then processed by the device DIS1. When the pixels arrive sequentially in a raster format, they are also stored in a video memory so as to be subsequently processed by the device DIS1.

The device DIS1 includes a processor or processing means MT1 for processing the image signal SIM and issuing, for each color component, an encoded image signal SIC. This encoded image signal is in practice a compressed image signal.

This image signal SIC is then issued via a wired connection, for example, to a screen controller CTRL including a decoding device DIS2. The signal SIC is processed by a processor or processing means MT2, which reconstitutes the sequence BMP of pixels assigned three color components Y, Cr, Cb with a view to the display of the image on a screen ECR, e.g., a screen of a high-definition television.

The processing means MT1 and MT2 may be implemented, for example, by specific integrated circuits (ASIC) or by software modules within processors, these software modules being capable of being stored in program memories, e.g., read-only memory (ROM, EEPROM, etc.).

A more detailed description will now be given, referring more particularly to FIG. 2 and the following figures, of an example of a method of encoding of the image signal SIM according to an example embodiment implemented by the processing means MT1 of the encoding device DIS1 incorporated in the MPEG decoder DEC.

Generally speaking, as illustrated in FIG. 2, the method of encoding includes, for at least some of the current samples PRi of the image signal SIM and for each physical magnitude assigned to this current sample, a localized encoding 20 of the signal. In the present case a localized encoding of the digital word represents the physical magnitude considered. This is done in a local reference frame RLC which includes the current sample and two reference samples which are chosen on the basis of a minimum gradient of the physical magnitude considered, from among the available samples of the sequence, e.g., in the neighborhood of the current sample.

For this physical magnitude for the sample considered, an encoded local digital signal SICL is then obtained. The set of encoded local signals SICL associated with the physical magnitude considered form the encoded image signal SIC associated with the physical magnitude considered.

Reference is now made more particularly to FIG. 3 for illustrating an implementation for determining for the current sample (pixel) considered PR the local reference frame RLC. NA available samples of the sequence are selected, and are assumed to be in this example NA neighboring samples of the current sample, with NA being at least equal to 2. Then, in step 30, for the physical magnitude considered having the level (amplitude) APR for the pixel PR, the gradient $GP_k$ is determined of the physical magnitude considered between the current sample PR and the neighboring sample of which the physical magnitude has the level $AP_k$. More precisely, $GP_k$ is equal to the difference between APR and $AP_k$.

After this determination has been performed for each of the NA neighboring samples of the current sample in step 31, the gradient is determined which has the lowest absolute value among the set of previously calculated gradients $GP_k$. Then, these operations are repeated for all the physical magnitudes assigned to the current sample, and in step 32 the gradient is determined having the lowest absolute value among the set of gradients determined for all the neighboring samples and all the physical magnitudes.

The neighboring sample to which this minimum gradient is assigned is then designated as a first reference sample A (step 33). Then, a second reference sample B is determined which, in the present case, is the remaining neighboring sample forming a right angle with sample A and the current sample PR. The reference sample PR and the two reference samples A and B together form the local reference frame RLC associated with the current sample PR.

Figure 4:
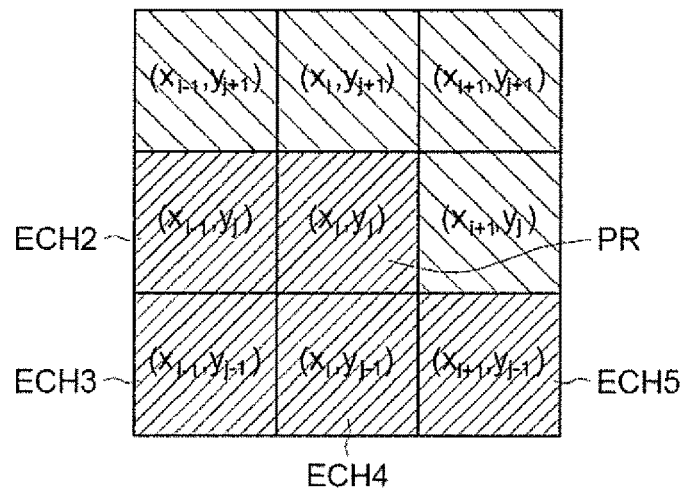
FIGS. 4-8 are schematic block diagrams of example local reference frames in accordance with example embodiments.
Figure 5:
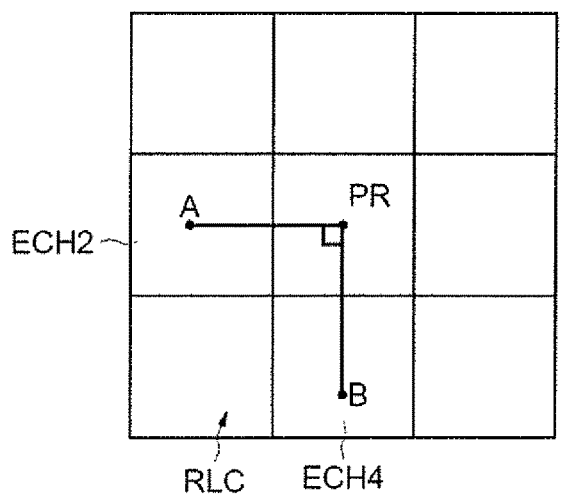

Possible examples of local reference frames will now be illustrated by referring more particularly to FIGS. 4 to 8. In FIG. 4, it is assumed that the pixels arrive sequentially in a "raster" format. It is also assumed in FIG. 4 that the current pixel (sample) PR with coordinates $x_i$ and $y_j$ is being processed, and that the preceding pixels ECH2, ECH3, ECH4 and ECH5 have already been processed by the encoding method.

On the other hand, the other pixels, i.e., the pixel with coordinates $x_{i+1}, y_j$ belonging to row j and the pixels belonging to row j+1 have not yet been processed. Consequently, the neighboring samples of the pixel PR, among which will be determined the first reference sample A and the second reference sample B, are the pixels ECH2, ECH3, ECH4 and ECH5.

This determined local reference frame RLC will be, in this example, the unique local reference frame associated with the current sample PR and valid for the encoding of all the physical magnitudes, i.e., here all the color components, of the current sample. Thus, in FIG. 5, the first reference sample A is the sample ECH2 and the second reference sample B is the sample ECH4.

Figure 6:
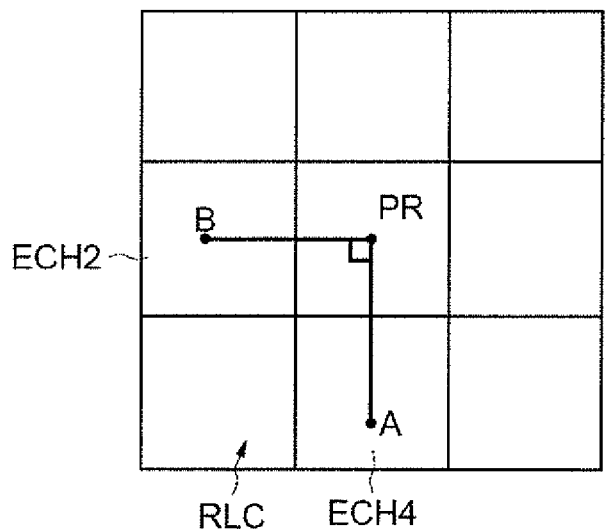

Another possible configuration is illustrated in FIG. 6, in which the first reference sample A is this time the sample ECH4 while the second reference sample B is this time the sample ECH2.

Figure 7:
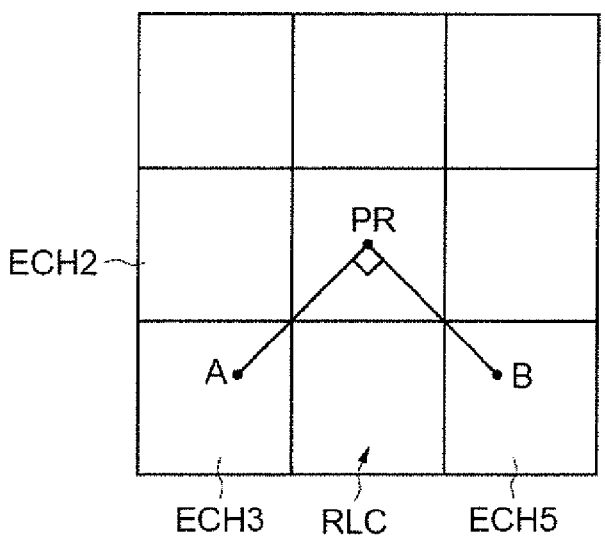

It is also possible, as illustrated in FIG. 7, to have another structure for the local reference frame RLC. In this structure, the first reference sample A is the sample ECH3, and the second reference sample B is the sample ECH5.

Figures 8, 9:
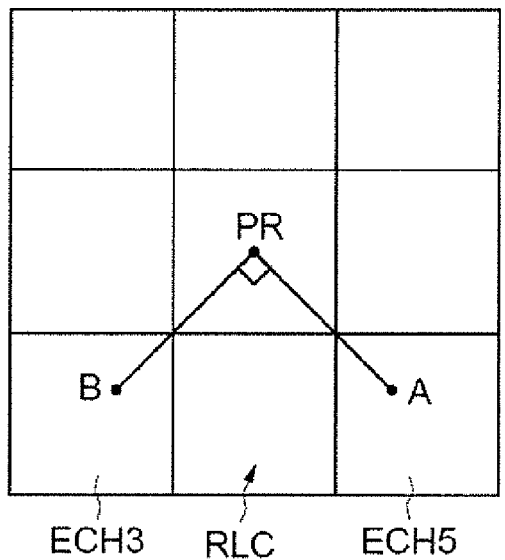
FIG. 9 is a logic table for setting parameters of reference sample positions in accordance with an example embodiment.

In the structure illustrated in FIG. 8, the first reference sample A is the sample ECH5, and the second reference sample B is the sample ECH3.

It may therefore be seen that it is possible to define a group of first bits for setting the parameters of the structure of the local reference frame.

In the example described here and as illustrated in FIG. 9, the group of first bits STRC includes two bits for setting the parameters of the four possible positions of the first reference sample A, and consequently the four possible structures of the local reference frame RLC. Thus, in the present example, if the first reference sample A is the sample ECH2, then the two bits STRC respectively equal 00.

If the reference sample A is the sample ECH3, then the two bits STRC respectively equal 01. If the first reference sample A is the sample ECH4, then the two bits STRC equal 1 and 0, whereas if the first sample A is positioned at the level of the sample ECH5, then the two bits STRC equal 1 and 1.

Figure 10:
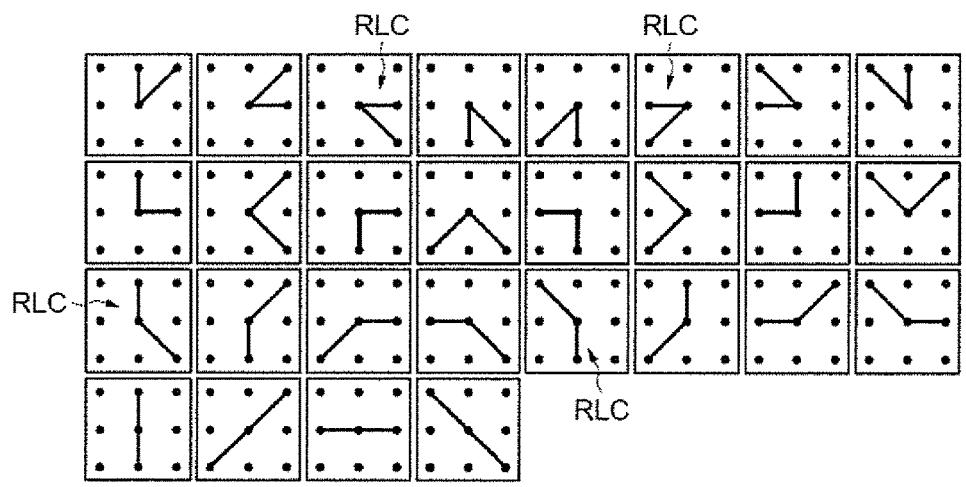
FIG. 10 is a schematic diagram illustrating different implementations of local reference frames which may be used in example embodiments.

As illustrated in FIG. 10, other structures of local reference frames are possible, not necessarily providing a right angle between the two rows respectively connecting the current sample to the two reference samples. However, while the first reference sample A always remains the one that is associated with the gradient having the lowest absolute value, the second reference sample B is either a sample forming a right angle with the current sample and the first reference sample, or the neighboring sample of the current sample associated with the largest absolute value of all the gradients calculated. Moreover, such local reference frames may also be used, for example, when the image is not processed in a "raster" format, but, for example, macroblock by macroblock.

In the examples that have just been described, the candidate samples used for determining the reference samples A and B were neighboring samples of the current sample PR. However, other available candidate samples are possible and may be farther away from the current sample PR. This is the case in the examples illustrated in FIGS. 11 and 12.

Figure 11:
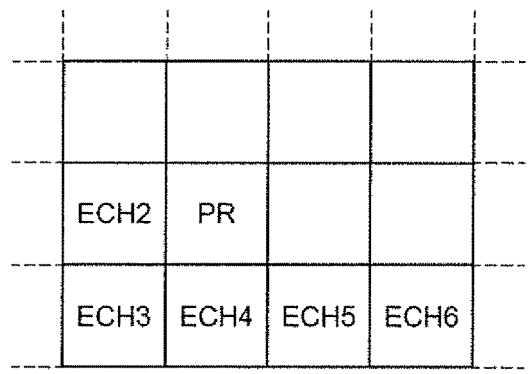
FIGS. 11 and 12 are schematic diagrams illustrating further implementations of local reference frames which may be used in example embodiments.
Figure 12:
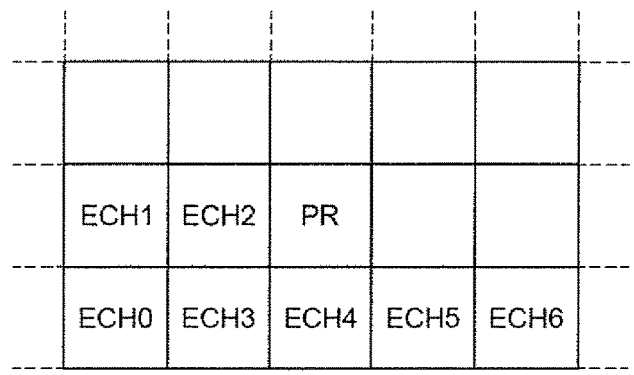

In FIG. 11, in addition to the samples ECH2-ECH5, the sample ECH6 may also be taken into account for determining the reference samples A and B. In FIG. 12, in addition to the samples ECH2-ECH5, the samples ECH0, ECH1 and ECH6 may also be taken into account for determining the reference samples A and B. Of course, according to the number of samples taken into account and therefore the number of possible structures, the group of first bits STRC may include more than 2 bits.

After the parameter setting of the local reference frame has been performed, the processing means MT1 are configured for setting the parameters, in this local reference frame, of the level APR of the physical magnitude considered.

Figure 13:
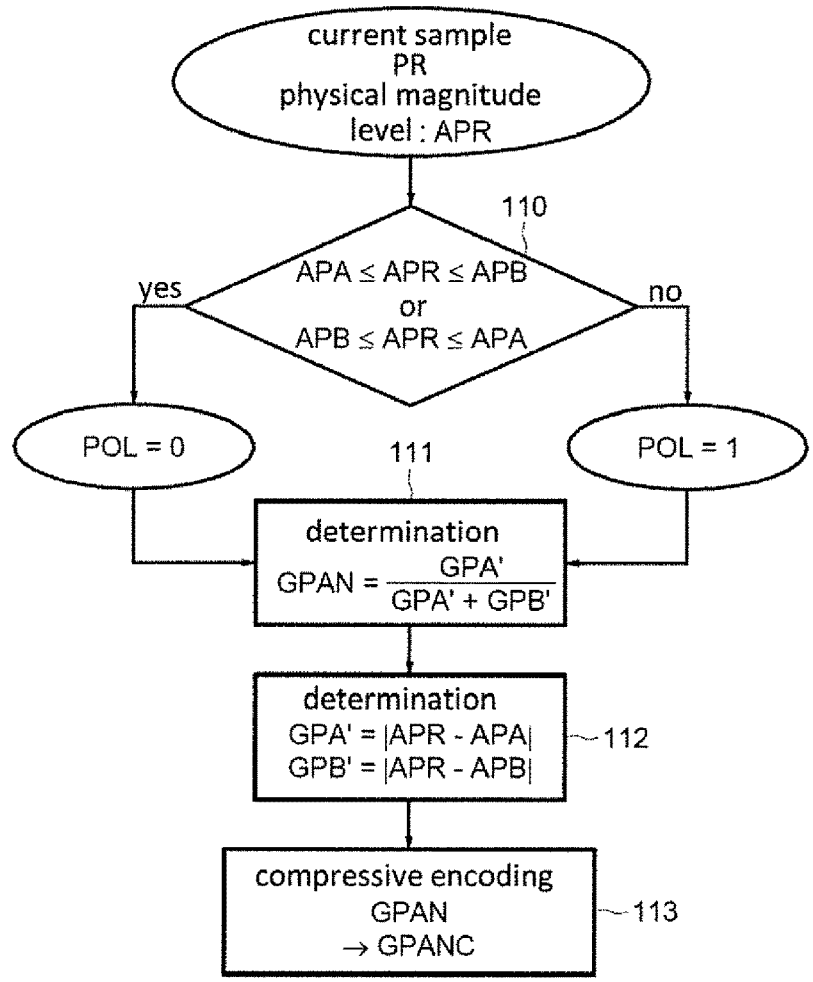
FIG. 13 is a flow diagram illustrating a compressive encoding approach in accordance with an example embodiment.

Another approach is illustrated in FIG. 13. In step 110, the processing means MT1 check whether the level of the physical magnitude APR is located between the level APA of the physical magnitude associated with the first reference sample A and between the level APB of the physical magnitude assigned to the second reference sample B, or between APB and APA. If such is the case, it is a matter of interpolation and the processing means assign, for example, the logical value 0 to a polarity bit POL.

Otherwise, it is a matter of extrapolation, that is to say that the level APR is either greater than or equal to the level APA which is itself greater than or equal to the level APB. In this case, the processing means confer the value 1 on the polarity bit POL.

It should be noted that in the case of extrapolation, if the level APR is greater than the levels APA and APB, the level APB may not be higher than the level APA since the first reference sample A is the one for which there is the minimum gradient.

Similarly, in the case where the level APR is lower than the two levels APA and APB, the level APA may not be higher than the level APB for the same reason (minimum gradient for the first reference sample A).

One way to determine whether it is a matter of interpolation or extrapolation includes determining the product of the sign of the gradient GPA equal to APR−APA by the sign of the gradient GPB equal to APR−APB. If the sign of this product is positive, then the polarity bit POL is set to 1 (extrapolation), whereas if the product sign is negative then the polarity bit POL is set to zero (interpolation).

Figure 14:
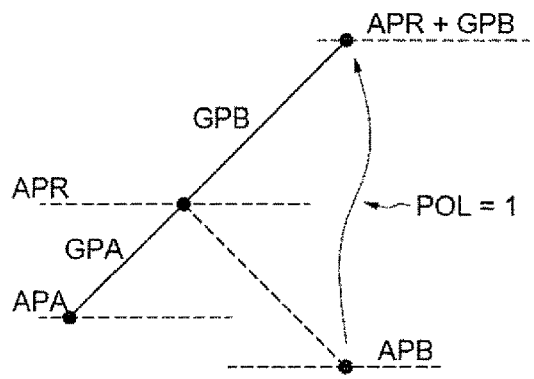
FIG. 14 is schematic diagram illustrating an embodiment in which the physical magnitude of a current sample is determined based upon extrapolation.

As illustrated in FIG. 14, in the case where it is a situation of extrapolation, it is brought down to a situation of interpolation by converting the amplitude APB into an amplitude equal to APR+GPB, which is a reversible operation at the decompression level, i.e., during the reconstruction of the level APR, taking into account the polarity bit POL, as will be explained in more detail below.

In step 111, the processing means MT1 determine the value GPA' equal to the absolute value of GPA (GPA=APR−APA) and the value GPB' equal to the absolute value of GPB (GPB=APR−APB).

Then, the processing means MT1 determine a parameter which is in this example of implementation a normalized gradient, from GPA' and GPB'. This normalized gradient GPAN is equal to GPA'/(GPA'+GPB').

Moreover, since a normalization has been performed extending between the values 0 and 1, the normalized gradient GPAN is also equal to 1-(GPB'/(GPA'+GPB')), to within an error. Then, the processing means in step 113 perform a compressive encoding of the normalized gradient GPAN so as to obtain a compressed normalized gradient GPANC on a group of second bits. As a guide, if the normalized gradient GPAN is coded on 10 bits, and provision may be made to code the compressed normalized gradient GPANC on five bits. The compression may be performed in a conventional way and known in itself with the aid of a compression curve.

Figure 15:
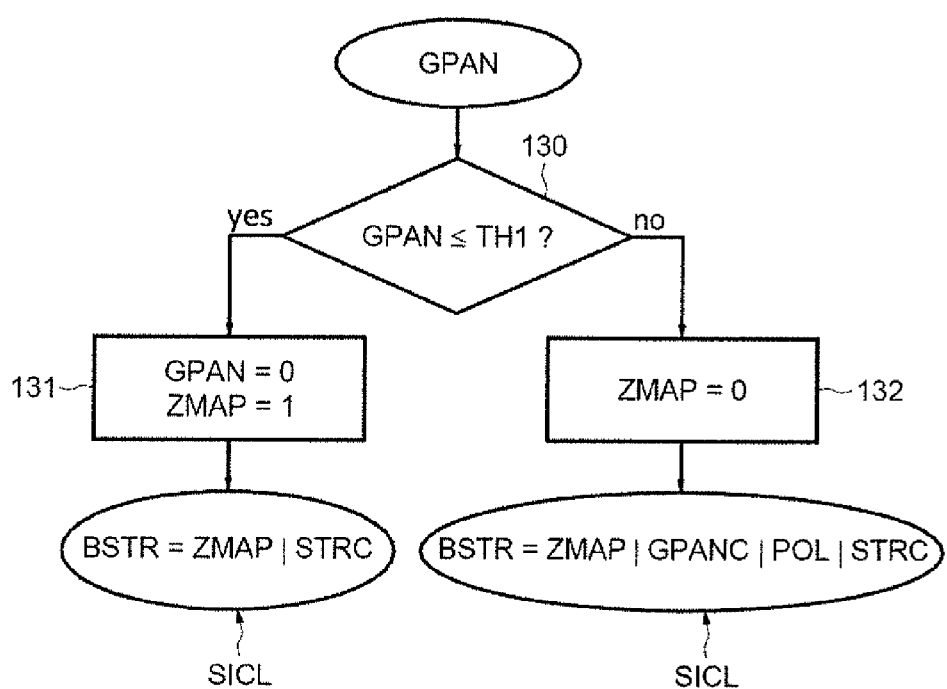
FIG. 15 is a flow diagram illustrating a comparison of a normalized gradient with a threshold in accordance with an example embodiment.

If reference is now made more particularly to FIG. 15, it is seen that the processing means MT1 in step 130 compare the normalized gradient GPAN with a threshold TH1. The processing means MT1 then prepare a third bit ZMAP the value of which is representative of the result of the comparison.

Thus, if the normalized gradient is less than or equal to the threshold TH1, then ZMAP is equal to 1. However, if the normalized gradient GPAN is greater than the threshold TH1, then ZMAP=0.

The value of the threshold TH1 depends on the application and the desired accuracy for the reconstruction of the image. As a guide, a threshold TH1 may be chosen equal to 0.1.

If the normalized gradient GPAN is less than or equal to the threshold TH1, then the processing means MT1 consider that this normalized gradient GPAN is zero (step 131). In this case, the encoded local signal STCL representative of the physical magnitude considered assigned to the sample includes a digital block BSTR, which includes only the third bit ZMAP and the first bits STRC representative of the structure of the local reference frame.

On the other hand, if in step 132 the third bit ZMAP has been set equal to zero, then the encoded local signal SICL relative to the level of the physical magnitude considered includes a digital block BSTR, the third bit ZMAP, the group of second bits representative of the compressed normalized gradient GPANC, the polarity bit POL and the first bits STRC representative of the structure of the local reference frame. The order of these various bits in the digital block BSTR is arbitrary and may be different.

Figure 16:
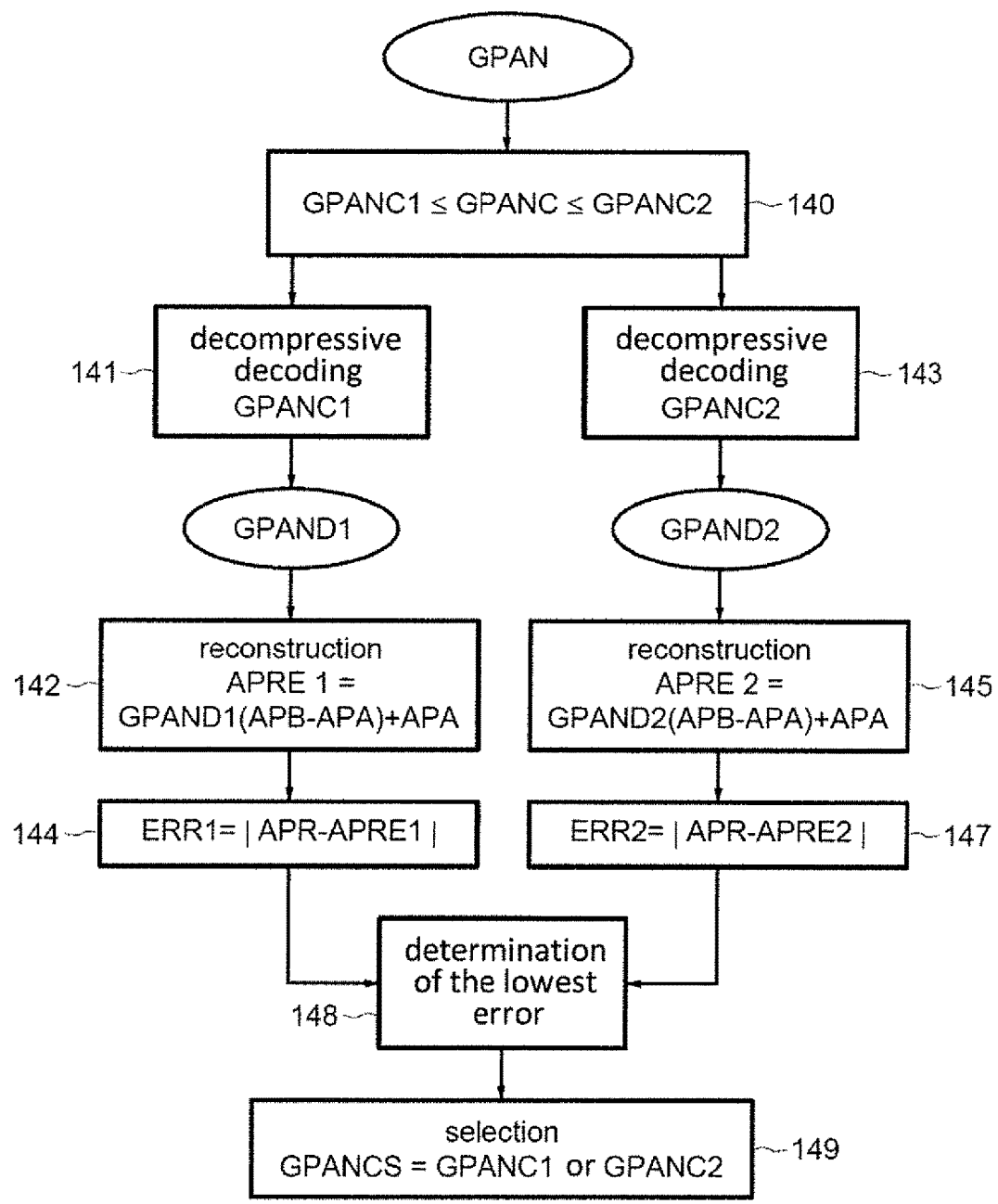
FIG. 16 is a flow diagram illustrating a feedback strategy in accordance with an example embodiment.

To control the quantization error, a feedback strategy may be advantageously implemented as illustrated in FIG. 16. More particularly, the processing means MT1 prepare in step 140 from the compressed normalized gradient GPANC a first compressed additional digital word GPANC1 and a second compressed additional digital word GPANC2 surrounding the compressed normalized gradient GPANC.

Generally speaking, the term "surrounding" should be taken in a very broad sense. Thus, the words GPANC1 and GPANC2 may be different from GPANC. However, in practice, one of the two words GPANC1 or GPANC2 may be taken as equal to the word GPANC. Moreover, in the present case, the first word GPANC1, for example, will be chosen to be equal to the compressed normalized gradient GPANC. However, the additional digital word GPANC2 will be, for example, slightly higher than the compressed normalized gradient GPANC, e.g., by increasing the least significant bit (LSB) of the compressed normalized gradient GPAC by 1.

The processing means MT1 then perform a decompressive decoding 141 of the first additional digital word GPANC1 using the same curve as that used for compression. A first decompressed additional digital word GPAND1 is then obtained. Then, the processing means MT1 reconstruct the level APRE1 of the physical magnitude considered from the word GPAND1 and levels APB and APA. More particularly, APRE1 is equal to GPAND1(APB−APA)+APA.

The processing means then determine in step 144 a first error ERR1 equal to the absolute value of the difference between APR and APRE1. In the same way, the processing means MT1 perform a decompressive decoding of the second additional digital word GPANC2 to obtain a decompressed word GPAND2 then reconstruct, in step 145, the level APRE2 of the physical magnitude considered from the word GPAND2 and levels APB and APA, in a similar way to what was done in step 142.

The processing means then determine in step 147 a second error ERR2 equal to the absolute value of the difference between APR and APRE2. The processing means MT1 then determine in step 148 the lowest error and accordingly select the compressed additional digital word GPANCS as being that one of the two words GPANC1 or GPANC2 associated with the lowest error.

Figure 17:
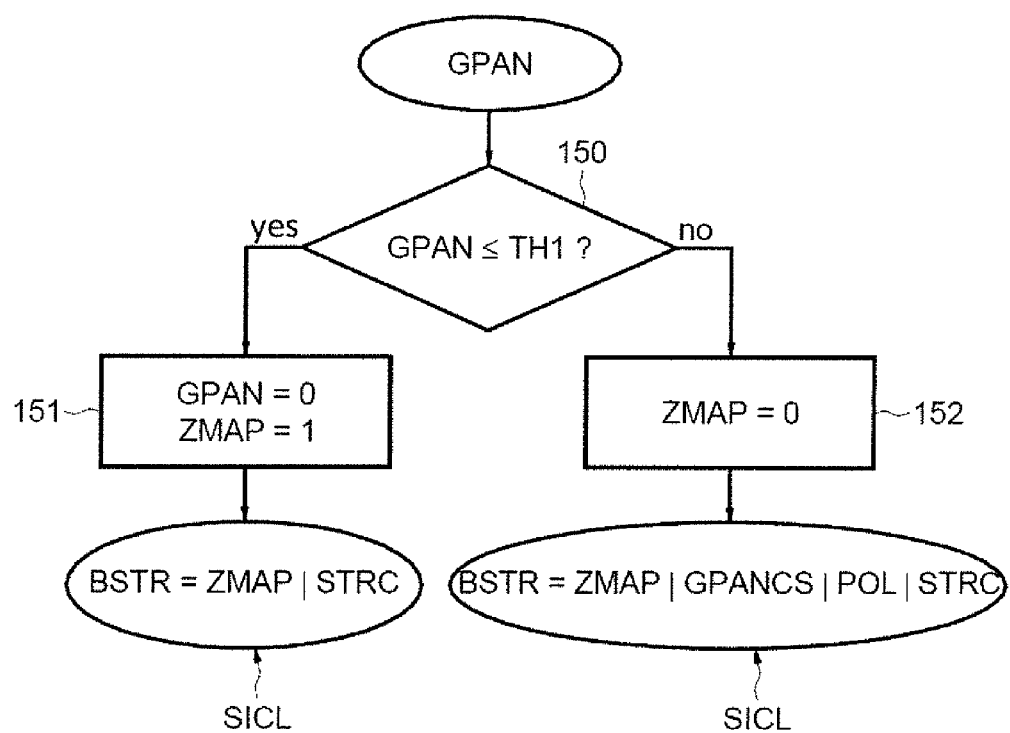
FIG. 17 is a flow diagram illustrating a comparison of a normalized gradient with a threshold in accordance with another example embodiment.

As illustrated in FIG. 17, in the case where the third bit MAP is equal to zero, the encoded local signal SICL comprises the digital block BSTR, this time including the selected compressed digital word GPANCS in place of the compressed normalized gradient GPANC.

Figure 18:
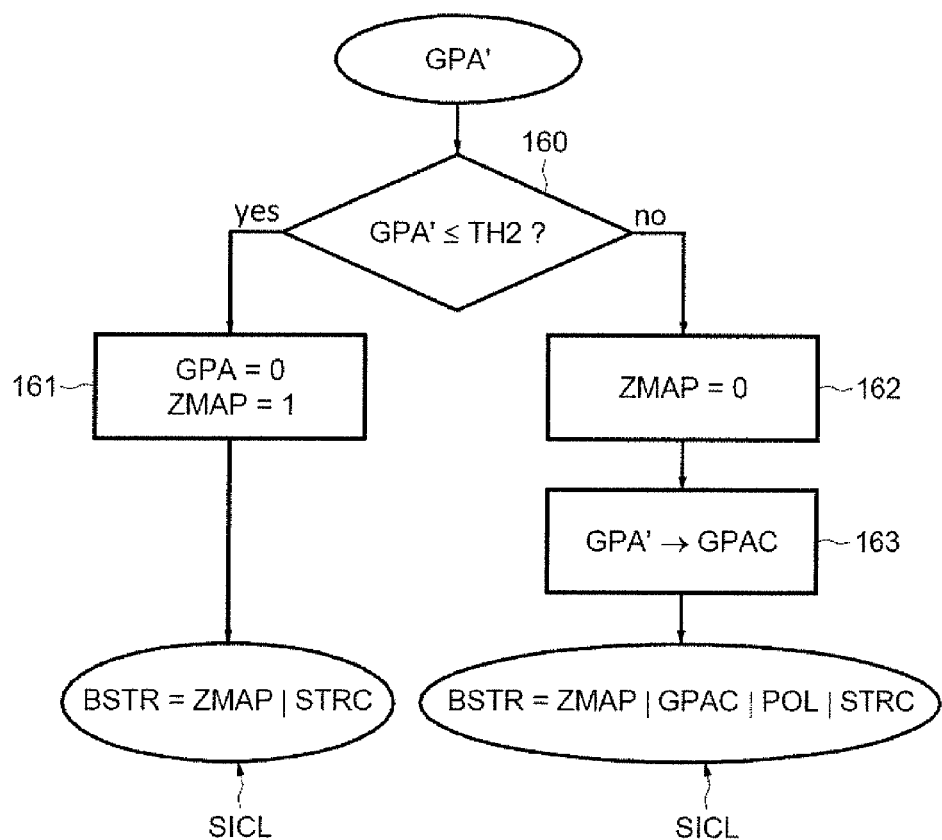
FIG. 18 is a flow diagram illustrating a comparison of a different parameter than the normalized gradient with a threshold in accordance with another example embodiment.

In another variant, it is possible to use as a parameter, not the normalized gradient GPAN, but GPA' directly, i.e., the absolute value of the difference between APR and APA. That is, this is the absolute value of the first gradient GPA. This is illustrated in FIG. 18.

In this variant the polarity bit POL is the sign of (APR−APA), i.e. it indicates whether APR is less than APA or greater than APA. If APR is greater than APA then POL=0 whereas if APR is less than APA then POL=1. This time (step 160) GPA' is compared with a threshold TH2, which may, for example, be taken equal to 0.05, assuming that APR varies between the values 0 and 1.

If GPA' is less than or equal to TH2, then GPA is considered as zero and ZMAP=1 (step 161). The signal SICL then includes the digital block BSTR which comprises only the bits ZMAP and STRC.

If GPA' is greater than the threshold TH2, then ZMAP=0 (step 162) and a compressive encoding of GPA' is performed. This is done in a similar way to what has been described for GPAN to obtain a first compressed gradient GPAC (step 163). The signal SICL then includes the digital block BSTR which comprises ZMAP, GPAC, POL, and STRC.

Figure 19:
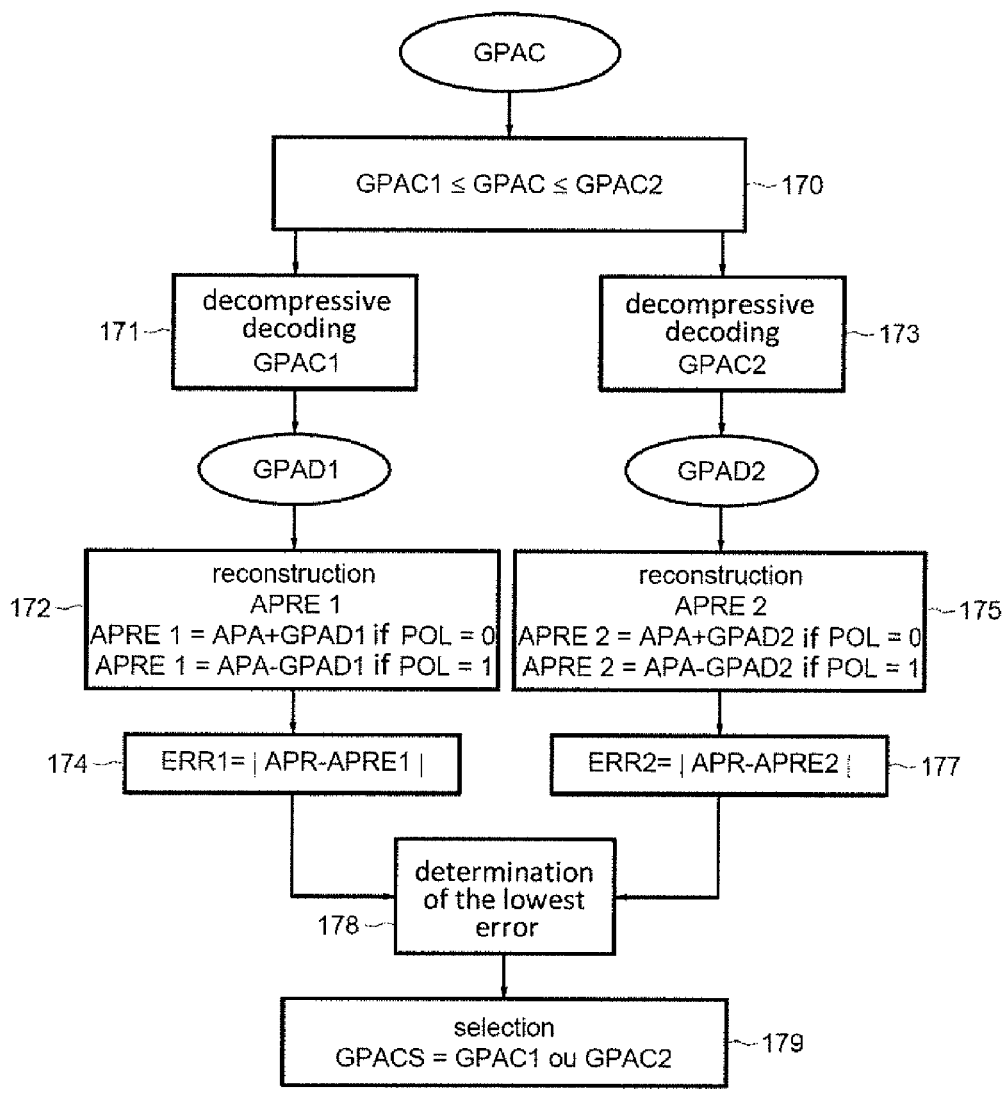
FIG. 19 is a flow diagram illustrating a feedback strategy in accordance with another example embodiment.

A feedback strategy may also be implemented by analogy with what has been described in FIG. 16, which is shown in FIG. 19. In this figure the compressed parameter is GPAC in place of GPANC. Steps 170 to 179 are similar to steps 140 to 149 in FIG. 14. Consequently, in the final step 179, the word GPACS is selected as being the one of the two words GPAC1 and GPAC2 which is associated with the lowest error.

In steps 172 and 175, the formulae for reconstruction of the level APREi are different from those applied in steps 142 and 145. More particularly:

if POL=0 then APREi=APA+GPADi, and
if POL=1 then APREi=APA−GPADi.

Figure 20:
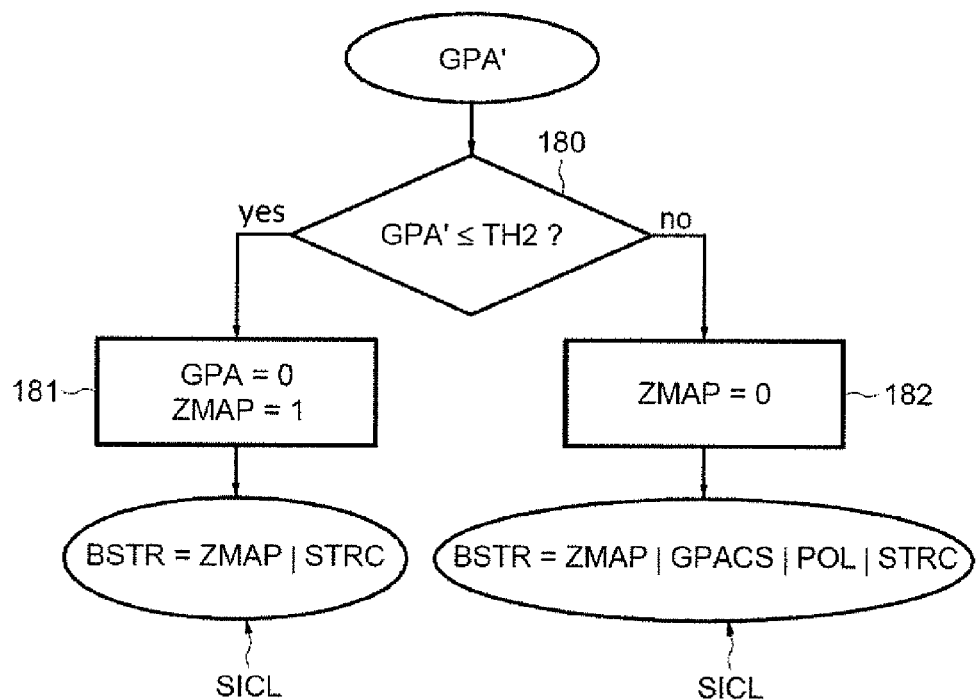
FIG. 20 is a flow diagram illustrating a comparison of a different parameter than the normalized gradient with a threshold in accordance with still another example embodiment.

Then as illustrated in FIG. 20, if GPA' is less than or equal to the threshold TH2 (step 180), then GPA' and therefore GPA is considered as equal to 0 and ZMAP=1 (step 181) and the digital block BSTR includes only ZMAP and STRC. If GPA' is greater than the threshold TH2, then ZMAP=0 (step 182) and BSTR contains ZMAP, GPACS, POL and STRC.

Figure 21:
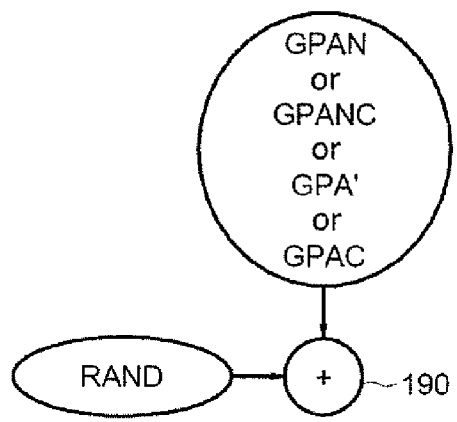
FIG. 21 is schematic diagram illustrating the addition of a pseudo-random magnitude to the normalized gradient or compressed normalized gradient in accordance with an example embodiment.

In order to randomly disperse the quantization error, it is particularly advantageous, as illustrated in FIG. 21, to add a pseudo-random magnitude RAND (step 190) to the normalized gradient GPAN or to the compressed normalized gradient GPAC or to GPA' or to GPAC.

Figure 22:
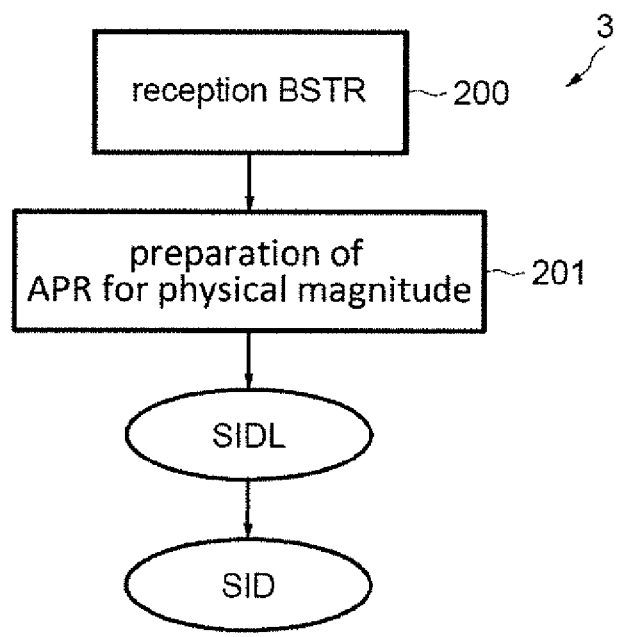
FIG. 22 is a flow diagram illustrating issuing of a decoded local signal in accordance with an example embodiment.

On reception, as illustrated in FIG. 22, the processing means MT2 will prepare, for each current sample and for each physical magnitude assigned to this current sample, the level of the physical magnitude considered from the digital block BSTR received in step 200 to issue a decoded local signal SIDL, i.e., to issue the level of the physical magnitude considered. The set of decoded local signals SIDL forms a decoded signal SID. This preparation will take account of the contents of the digital block BSTR received, and notably the values of the bits ZMAP, and STRC, and optionally of the bits POL and GPAC or POL and GPANC. It is assumed here that the optionally used parameter was the normalized gradient GPAN.

If the bit ZMAP is equal to 1, this means that it was the case that GPAN was zero and consequently, the value of the physical magnitude assigned to the current sample PR is then simply equal to the value APA of this physical magnitude assigned to the reference sample A. This sample A has already been processed previously. Consequently, the value APA is known.

In addition, the bits STRC may be used to determine the configuration of the local reference frame, and consequently the coordinates of the sample A in the pixel matrix. In the case where the bit ZMAP is equal to zero, there are multiple cases to consider. In the case where the polarity bit POL is 1, i.e., in the case where an extrapolation configuration applied, the level APR of the physical magnitude considered is recalculated from the following formula:

$$APR = APA + (APB - APA)GPAN/(2GPAN-1) \quad (1)$$

In this formula, GPAN has been obtained by a decompressive decoding of GPANC (or of GPANCS).

It should be noted that formula (1) is valid for both possible cases of extrapolation, i.e., in the case where APB is less than or equal to APA itself less than or equal to APR, and in the case where APB is greater than or equal to APA itself, greater than or equal to APR.

In the case where the polarity bit POL is zero, i.e., in a case of interpolation, the level APR of the physical magnitude considered is recalculated from formula (2) or from formula (3) below:

$$APR = APA - APA \cdot GPAN + APB \cdot GPAN \quad (2)$$

$$APR = APB + APA \cdot GPAN - APB \cdot GPAN \quad (3)$$

according to whether APA is smaller or larger than APB, respectively. More particularly, if APA is less than or equal to APR itself less than or equal to APB, then formula (2) applies. If APB is less than or equal to APR itself less than or equal to APA, then formula (3) applies. Moreover, the condition of APA being smaller or larger than APB is determined by the processing means MT2 since these levels are already known, as they are assigned to samples already processed.

In the case where the parameter used during the encoding is the absolute value GPA' of the first gradient GPA (GPA'=|GPA|=|APR−APA|), and the bit POL is representative of the sign of APR−APA ((POL)=sign(APR−APA)), then in the case where ZMAP=0, the level APR of the physical magnitude assigned to the current sample PR is reconstructed by the following formulae:

$$APR = APA + GPAC \text{ if } POL = 0, \text{ and}$$

$$APR = APA - GPAC \text{ if } POL = 1,$$

where GPAC is the compressed parameter received in the digital block BSTR. In the case of an error feedback GPAC is replaced by GPACS. If ZMAP=1, then as in the preceding variant, APR=APA.

Figure 23:
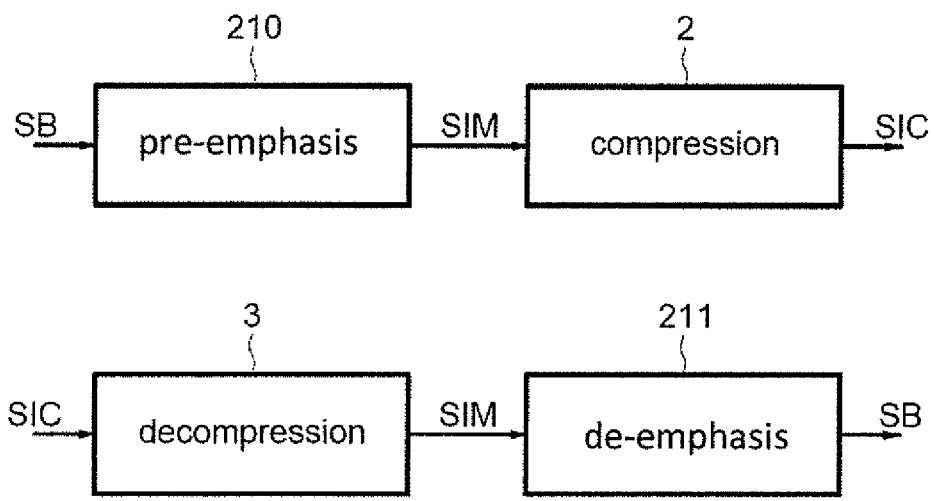
FIG. 23 is a schematic block diagram illustrating compression and decompression operations in accordance with an example embodiment.

The disclosure is not limited to the implementations and embodiments that have just been described but includes other variants thereof. Thus, as illustrated in FIG. 23, it is particularly advantageous to have the encoding 2 preceded by a pre-emphasis preprocessing performed, for example, in a conventional way by a correction γ ($x^{-\gamma}$), or with the aid of a perceptual quantization curve, or else with an S curve or with the aid of a table (e.g., a "look-up table").

Figures 24, 25:
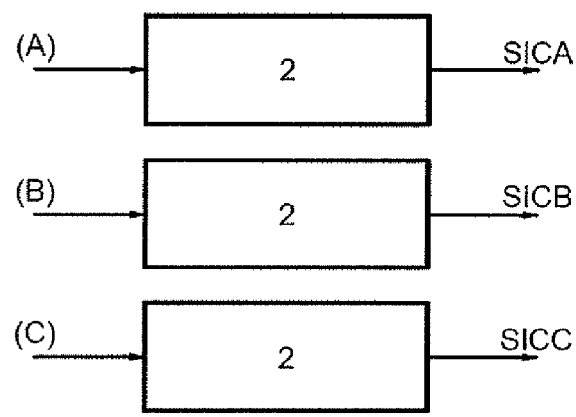
FIG. 24 is a schematic diagram in which a sequence of sample has been broken down into subsequences in accordance with an example implementation.
FIG. 25 is a schematic block diagram illustrating parallel encoding processing of the subsequences shown in FIG. 24.

In this case, the decoding 3 is followed by a de-emphasis post-processing 211 using an inverse function of the function used in the processing 180. In some cases, the sequence of samples, e.g., the sequence of pixels, may be broken down into subsequences. This is the case, for example, as illustrated in FIG. 24, where the pixels are encoded in the YCB 420 format.

More particularly, the subsequence (A) (of pixels) comprises the pixels assigned $YC_bC_r$ components. The subsequence (B) comprises the pixels assigned Y components, and the subsequence (C) includes the pixels surrounded by the pixels of the subsequence (B) and also assigned the Y component thereto.

In this case, the processing means MT1 may apply successively or in parallel (FIG. 25) the encoding processing 2 which has just been described on the subsequences (A), (B) and (C) respectively, to issue encoded signals SICA, SICB and SICC. In this case, for the subsequence (A), for example, the neighboring pixels of a current pixel (A) will be chosen from among the pixels (A) adjacent to this current pixel (A). The same applies by analogy to the pixels (B) and (C).

Moreover, in some cases, some samples may not undergo the encoding processing that has just been described. More particularly, for some predefined sample positions which are known via the encoding device and the decoding device, it would be possible for each physical magnitude considered to transmit its level APR directly without it being necessary to transmit the third bit ZMAP. This is the case, for example, for each pixel of the first row and the first column of a frame or a macroblock or even for the first pixels of a frame or a macroblock examined helically.

Moreover, in some applications that notably require a higher accuracy, it is possible, after having determined the third bit ZMAP for a current sample, not to calculate the compressed normalized gradient GPANC or the absolute value GPA' of the first gradient GPA, and to transmit the level APR of the physical magnitude considered directly. In this case, if the bit ZMAP is equal to zero, then the digital block BSTR includes the bit ZMAP followed by the level APR, whereas if the bit ZMAP is equal to 1, the digital block BSTR includes the bit ZMAP followed by the first bits STRC.

The invention claimed is:

1. A method of encoding an initial digital signal into an encoded signal, the initial digital signal comprising a sequence of samples representing a multidimensional space, with each sample being assigned at least one physical magnitude, the method comprising:
    selecting a plurality of reference samples based upon a desired gradient of the at least one physical magnitude from among available samples of the sequence of samples; and
    for a plurality of current samples of the sequence of samples, locally encoding the signal into encoded local digital signals in local reference frames each including the current sample considered and the selected reference samples so that the encoded signal includes the encoded local digital signals, wherein each localized encoding comprises, for each physical magnitude assigned to the current sample, setting a digital parameter of the local reference frame and the level of the physical magnitude in the local reference frame to obtain the local encoded signal associated with the current sample and the physical magnitude.

2. A method of encoding an initial digital signal into an encoded signal, the initial digital signal comprising a sequence of samples representing a multidimensional space, with each sample being assigned at least one physical magnitude, the method comprising:
    selecting a plurality of reference samples based upon a desired gradient of the at least one physical magnitude from among available samples of the sequence of samples; and for a plurality of current samples of the sequence of samples, locally encoding the signal into encoded local digital signals in local reference frames each including the current sample considered and the selected reference samples so that the encoded signal includes the encoded local digital signals, wherein each localized encoding comprises, for each physical magnitude assigned to the current sample, determining the local reference frame formed by the current sample and the plurality of reference samples selected by determining a gradient having a lowest absolute value among gradients of the physical magnitude between the current sample and a plurality of neighboring samples of the current sample, wherein a first reference sample of the local reference frame is selected by determining the gradient having the lowest absolute value among the gradients of the physical magnitude; and wherein a second reference sample comprises a remaining available sample forming a right angle with the first reference sample and the current sample, or a remaining available sample selected by determining the gradient having the largest absolute value among the gradients of the physical magnitude, wherein each sample is assigned a plurality of physical magnitudes, and for each current sample the determination of the local reference frame comprises determining a unique local reference frame valid for the physical magnitudes assigned to the current sample.

3. The method of claim 2, wherein determining the local reference frame further comprises, for each current sample belonging to a group of at least three samples including the current sample and at least two available samples of the sequence:
    for each physical magnitude, determining the gradients of the physical magnitude between the current sample and each available sample;
    selecting the first reference sample from among the available samples of which the associated gradient has the lowest absolute value among the gradients calculated for all the physical magnitudes; and
    determining the second reference sample from among the remaining available samples forming a right angle with the first reference sample and the current sample, or wherein the associated gradient has the largest absolute value among the gradients calculated for the physical magnitudes.

4. The method of claim 3 wherein for each current sample the group includes the current sample and a plurality of neighbouring samples, and the second reference sample forms a right angle with the first reference sample and the current sample.

5. The method of claim 2, wherein setting the parameter of the local reference frame comprises preparing a group of first bits having values that define a structure of the local reference frame from among a set of possible different structures.

6. The method of claim 5 wherein setting the parameter of the level of the physical magnitude in the local reference frame includes determining a polarity bit having a value that indicates at least the positioning of the level of the physical magnitude assigned to the current sample with respect to the level of the physical magnitude assigned to the first reference sample.

7. The method of claim 1, wherein setting the parameter of the level of the physical magnitude in the local reference frame comprises:
preparing a parameter including at least the absolute value of the gradient of the physical magnitude between the current sample and the first reference sample;
comparing the prepared parameter with a threshold; and
preparing a third bit representative of the result of the comparison.

8. The method of claim 7 wherein if the prepared parameter is less than or equal to the threshold then it is considered as zero.

9. The method of claim 7 wherein setting the parameter further comprises a compressive encoding on a group of second bits of the prepared parameter to generate a compressed parameter.

10. The method of claim 9 wherein the polarity bit indicates whether the level of the physical magnitude assigned to the current sample is or is not located between the level of the physical magnitude assigned to the first reference sample and the level of the physical magnitude assigned to the second reference sample; and wherein setting the parameter of the level of the physical magnitude in the local reference frame further comprises:
determining the absolute value of the gradient of the physical magnitude between the current sample and the second reference sample; and
determining a normalised gradient from the absolute values of the first gradient and the second gradient, the normalised gradient forming the parameter.

11. The method of claim 9 wherein the polarity bit indicates whether the level of the physical magnitude assigned to the current sample is less than or greater than the level of the physical magnitude assigned to the first reference sample; and wherein the absolute value of the first gradient forms the parameter.

12. The method of claim 11 wherein the encoded local digital signal associated with the physical magnitude assigned to the current sample includes at least the third bit.

13. The method of claim 12 wherein the encoded local digital signal associated with the physical magnitude assigned to the current sample includes the group of first bits, the compressed parameter, and the polarity bit.

14. The method of claim 13 wherein if the parameter is less than or equal to the threshold, the encoded local digital signal then includes only the group of first bits and the third bit, and if the parameter is greater than the threshold, the encoded local digital signal then includes the group of first bits, the compressed parameter, the polarity bit, and the third bit.

15. The method of claim 13 wherein setting the parameter of the level of the physical magnitude in the local reference frame further comprises:
preparing from the compressed parameter a first compressed additional digital word and a second compressed additional digital word surrounding the compressed parameter;
decompressively decoding the first compressed additional digital word;
reconstructing the level of the physical magnitude from the first decoded additional digital word to obtain a first reconstructed level for the physical magnitude;
preparing a first error between the level of physical magnitude and the first reconstructed level;
decompressively decoding the second compressed digital word;
reconstructing the level of the physical magnitude from the second decoded additional digital word to obtain a second reconstructed level for the physical magnitude;
preparing a second error between the level of physical magnitude considered and the second reconstructed level; and
selecting the first or the second compressed additional digital word providing the lowest error of the first error and the second error;
wherein if the parameter is less than or equal to the threshold then it is then considered as zero and the encoded local digital signal includes only the group of first bits and the third bit, and if the parameter is greater than the threshold then the encoded local digital signal includes the group of first bits, the selected compressed additional digital word, the polarity bit and the third bit.

16. The method of claim 15 wherein setting the parameter of the level of the physical magnitude in the local reference frame further comprises adding a pseudo-random quantity to the parameter or to the compressed parameter.

17. The method of claim 1 wherein the sequence of samples is subdivided into a plurality of subsequences; and wherein the current samples on which the localized encodings are performed belong to at least one of the subsequences.

18. The method of claim 1 wherein the initial digital signal comprises a video signal, and wherein each sample comprises a pixel and each physical magnitude comprises a colour component of the pixel.

19. The method of claim 1 wherein the initial signal is generated based upon pre-emphasis processing a base signal.

20. The method of claim 1 further comprising, for each current sample and for each physical magnitude, determining the level of the physical magnitude from the encoded local digital signal associated with the current sample to generate a decoded local signal comprising the decoded local signals.

21. The method of claim 20 further comprising performing a de-emphasis post-processing on the decoded signal.

22. The method of claim 1 wherein the desired gradient comprises a minimum gradient.

23. A device for encoding an initial digital signal in an encoded signal, the initial digital signal comprising a sequence of samples representing a multidimensional space, with each sample being assigned at least one physical magnitude, the device comprising:

a memory and a processor cooperating therewith to
　select a plurality of reference samples based upon a minimum gradient of the at least one physical magnitude from among available samples of the sequence of samples, and
　for a plurality of current samples of the sequence of samples, locally encode the signal into encoded local digital signals in local reference frames each including the current sample considered and the selected reference samples so that the encoded signal includes the encoded local digital signals, wherein each localized encoding comprises, for each physical magnitude assigned to the current sample, setting a digital parameter of the local reference frame and the level of the physical magnitude in the local reference frame to obtain the local encoded signal associated with the current sample and the physical magnitude.

24. The device of claim 23 wherein each localized encoding comprises, for each physical magnitude assigned to the current sample, determining the local reference frame formed by the current sample and the plurality of reference samples selected by determining a gradient having a lowest absolute value among gradients of the physical magnitude between the current sample and a plurality of neighboring samples of the current sample.

25. A non-transitory computer-readable medium having computer-executable instructions for causing a computer to encode an initial digital signal in an encoded signal, the initial digital signal comprising a sequence of samples representing a multidimensional space, with each sample being assigned at least one physical magnitude, the computer-executable instructions for causing the computer to perform steps comprising:
　selecting a plurality of reference samples based upon a minimum gradient of the at least one physical magnitude from among available samples of the sequence of samples; and
　for a plurality of current samples of the sequence of samples, locally encoding the signal into encoded local digital signals in local reference frames each including the current sample considered and the selected reference samples so that the encoded signal includes the encoded local digital signals, wherein each localized encoding comprises, for each physical magnitude assigned to the current sample, setting a digital parameter of the local reference frame and the level of the physical magnitude in the local reference frame to obtain the local encoded signal associated with the current sample and the physical magnitude.

26. The non-transitory computer-readable medium of claim 25 wherein each localized encoding comprises, for each physical magnitude assigned to the current sample, determining the local reference frame formed by the current sample and the plurality of reference samples selected by determining a gradient having a lowest absolute value among gradients of the physical magnitude between the current sample and a plurality of neighboring samples of the current sample.

* * * * *